United States Patent [19]

Hoch

[11] 4,180,356
[45] Dec. 25, 1979

[54] BROKEN TOOL DETECTOR

[76] Inventor: Norman J. Hoch, 13760 LaBelle, Oak Park, Mich. 48237

[21] Appl. No.: 930,699

[22] Filed: Aug. 3, 1978

[51] Int. Cl.² .................. B23B 39/04; B23B 39/00
[52] U.S. Cl. .................................... 408/8; 408/7; 408/11
[58] Field of Search .............. 408/5, 6, 7, 8, 9, 10, 408/11, 12, 13

[56] References Cited

U.S. PATENT DOCUMENTS

| | | | |
|---|---|---|---|
| 2,079,640 | 5/1937 | Vickers et al. | 408/11 |
| 3,051,023 | 8/1962 | Hirsch | 408/11 |
| 3,208,311 | 9/1965 | Pierce | 408/11 |
| 3,302,492 | 2/1967 | Weidig | 408/8 |
| 3,487,730 | 1/1970 | Dohring et al. | 408/10 |
| 3,566,719 | 2/1971 | Smith | 408/11 |
| 3,838,934 | 10/1974 | Petroff | 408/7 |
| 4,090,802 | 5/1978 | Bilz | 408/11 |

*Primary Examiner*—Harrison L. Hinson
*Attorney, Agent, or Firm*—Fisher, Gerhardt, Crampton & Groh

[57] ABSTRACT

A detecting apparatus for machine tools with rotating spindles having adapter for holding tools such that when any of the tools engage an obstacle such as another broken tool or a workpiece, a signal is generated and is transmitted to a timer activated for predetermined periods of time during selected phases of operation. The timer is responsive to the presence or to the absence of a signal during its active period to continue or to discontinue the cycle of machining operations.

14 Claims, 7 Drawing Figures

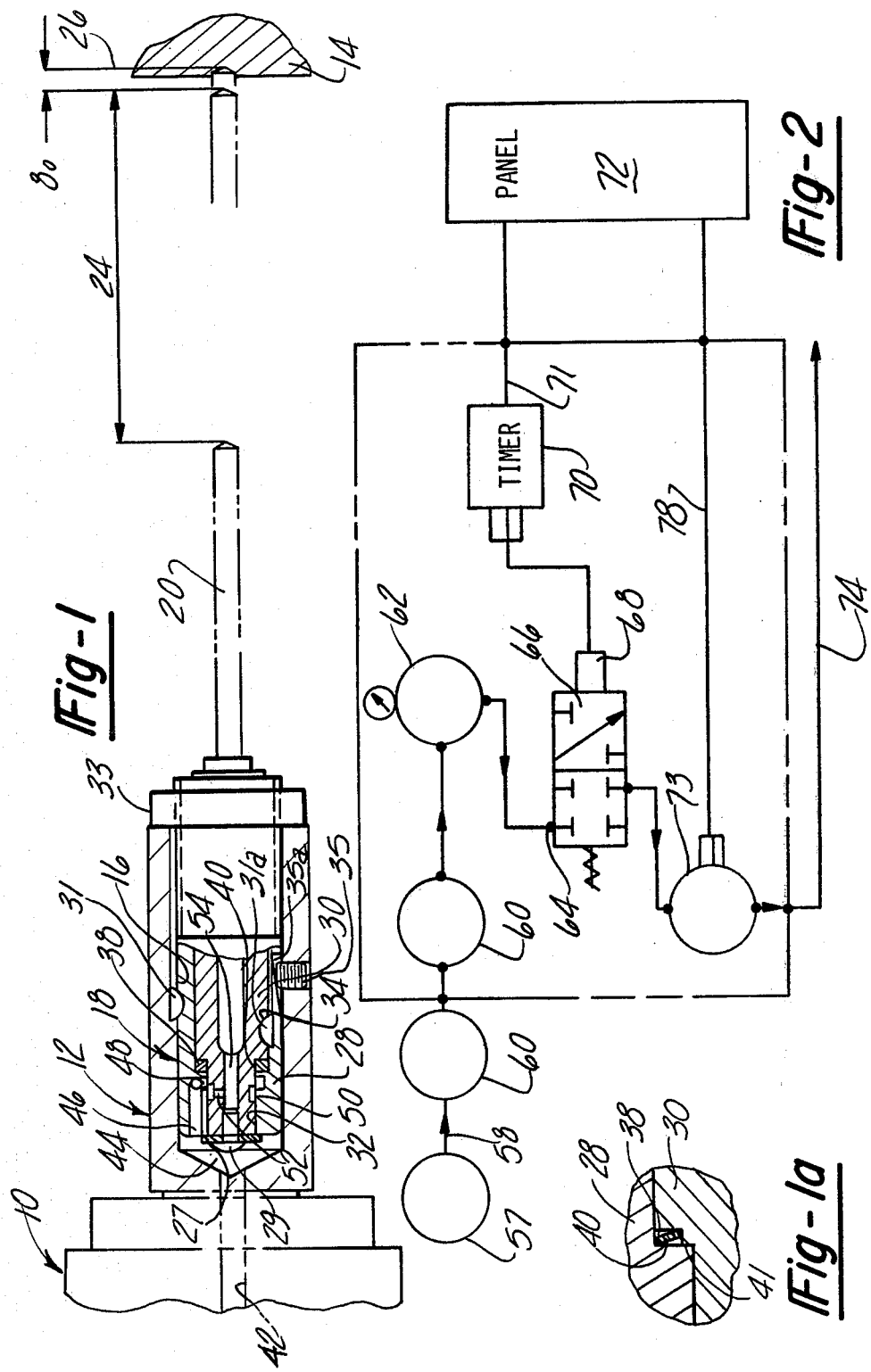

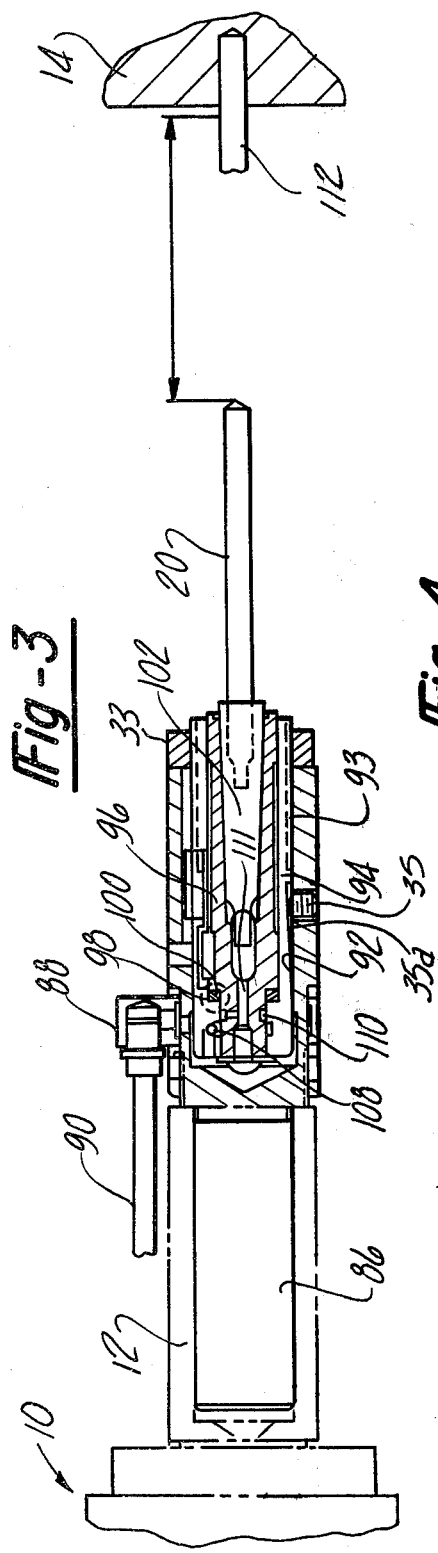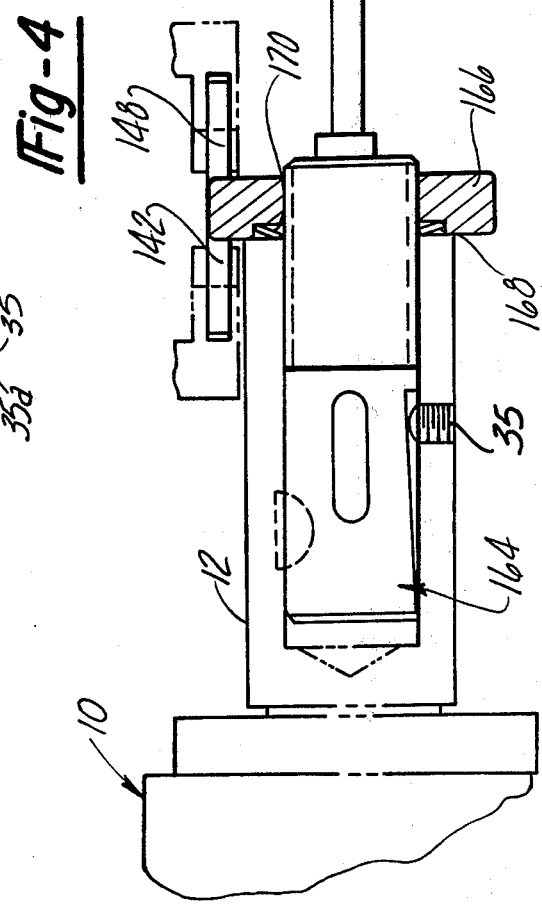

BROKEN TOOL DETECTOR

This invention relates to detecting devices and particularly to the device for detecting broken or improper tools and interupting the cycle of a machine operation.

The importance of detecting broken tools is very important since usually the work performed at one station in certain types of transfer machine must be completed before starting the machine operation at subsequent stations. Consequently, if a tool at one station is broken and the workpiece passes to the next station without being machined, the workpiece may be destroyed or the tool in the subsequent station may be damaged. Also in some machining operations the tools may be observed but in others the tools may be positioned in guides or bushings or submerged in coolant in which visual observation is neither practical nor possible.

It is an object of the invention to provide an improved detecting system arranged to indicate the existence of broken tools and to automatically shut down a machine operating the tools when such tools are detected.

A further object of the invention is to provide a tool detecting system which can employ either air pressure of electrical controls to generate a signal.

It is another object of the invention to provide a detecting system which is responsive to the presence or absence of a signal generated when a tool encounters an obstacle and is further conditioned to operate during a period of time that a timer is in operation.

The objects of this invention are accomplished by providing detecting apparatus for use with machine tools of the type having a head member movable toward and away from a work piece with a rotating spindle supported by the head member and provided with an adapter for holding a tool in such a manner that when the tool engages an obstacle such as a workpiece or a broken tool remaining in the workpiece the tool moves axially relative to the spindle against biasing means to generate a signal. A timer is activated for predetermined periods of time during the machining cycle in which such an obstacle might be encountered in a phase as the tool approaches the workpiece or in a phase in which the tool begins removing metal. In its active period the timer responds to either the presence of a signal in one of the phases or the absence of a signal in the other of the phases to discontinue the machining cycle.

These and other objects of the invention will be apparent from the following description and from the drawings in which:

FIG. 1 is a partial sectional view of a machine spindle showing an embodiment of the present invention;

FIG. 1a is a sectional view of a portion of the arrangement in FIG. 1 at a greatly increased scale.

FIG. 2 is a diagramatic representation of pneumatic circuitry used with the embodiment of the invention in FIG. 1;

FIG. 3 is the sectional view of a modification of the embodiment of the invention shown in FIG. 1;

FIG. 4 is a sectional view of another embodiment of the invention;

Figure 5:
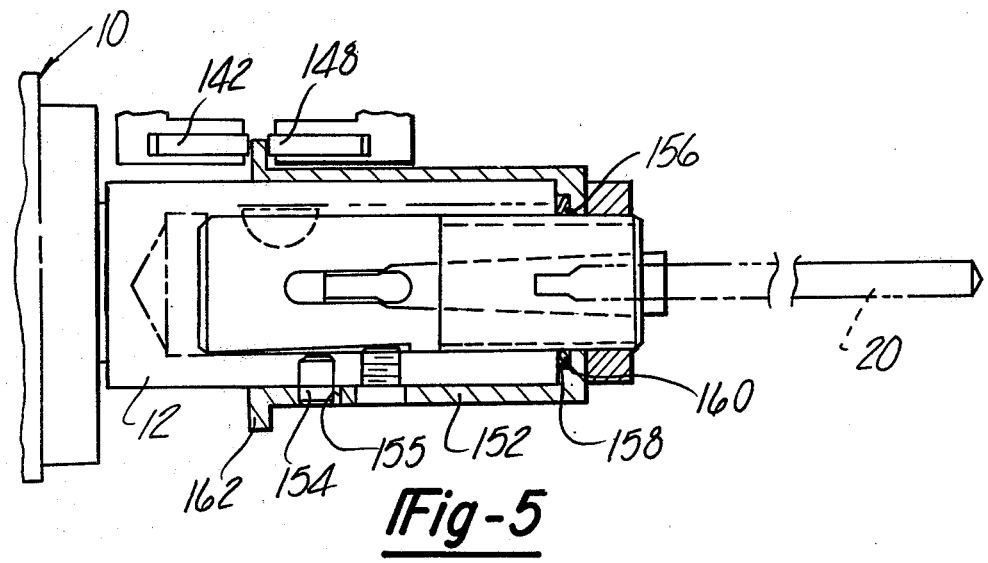
FIGS. 5 and 6 are modifications of the embodiment of the invention seen in FIG. 4.

Referring to FIG. 1 a machine head 10 supports a conventional machine spindle 12 for rotation and axial movement toward and away from a workpiece 14. The spindle 12 may be of a type used in drill heads or in other metal removing machinery and in particular larger multiple station operations where a number of sequential metal working operations are performed such as drilling, boring, reaming, chamfering, tapping or punch press operations and the like.

The machine spindle 12 is of conventional type and is provided with a central bore 16 for receiving an adaptor 18 supporting a tool 20 in the form of a drill bit. Rotation of the spindle 12 transmits rotary motion to the tool 20 as it advances towards a workpiece 14 in a rapid approach phase indicated by the dimension at 24 and performs the metal working operation in the feed phase indicated beyond the line at 26.

The adapter 18 is made up of a tubular outer element 28 slidably receiving an inner element 30. Elements 28 and 30 are held together by a washer 27 held in position at one end of inner element 30 by a screw 29. The elements 28 and 30 can move axially relative to each other but rotate as a unit with the spindle 12 by means of drive keys 31 and 31a. The outside surface of outer element 28 is threaded and receives a nut 33 that abuts the end of spindle 12 to determine the depth of hole that will be made by tool 20. The adapter 18 is held in axially fixed position in spindle 12 by a radially extending set screw 35 tightly engaged with the bottom of a notch 35a.

The outer element 28 has step bore portions 32 and 34 which are complementary to outer cylindrical surfaces on the inner element 30. The outer and inner elements 28 and 30 form an annular cavity 38 which receives a resilient element such as spring washer 40. The spring washer 40 acts to urge the inner and outer elements 28 and 30 axially apart. However, as seen in FIG. 1a, inner element 30 is provided with a shoulder 41 which engages a wall in the cavity 38 formed by the outer element 28. This engagement prevents the collapse of the spring washer 40 and also acts to transmit the thrust or load of the tool 20 from the inner element 30 to the outer element 28 and to the spindle 12.

Compressed air is introduced through a passageway 42 in the drill head 10 into a chamber 44 in one end of the bore 16 and at one end of the adapter 18. From the chamber 44 air communicates through an axially offset passage 46 in the outer elements 28 to annular passage 48. In the position shown in FIG. 1, the annular passage 48 communicates with another annular passage 50 formed in the smaller diameter portion of the inner element 30. The annular passage 50 communicates with a radial passage 52 to a vent passage 54 from which the air can escape to the atmosphere through slot 56. Prior to initial contact of the tool bit 20 with the workpiece 14, the annular passages 48 and 50 communicate with each other to permit air to be vented to the atmosphere through slot 56. When the tool bit 20 contacts the workpiece 14, the inner element 30 is displaced axially relative to the outer element 28 against the action of Belleville spring 40. This moves the annular passage 50 out of alignment with passage 48 cutting off further venting of air and resulting in a pressure build up in the various passages communicating with axial passage 12.

Referring now to FIG. 2, a typical pneumatic and electrical circuit for operating and controlling the detection system is illustrated. Air under pressure is normally available in plant operations from one or more central air supplies 57 and is supplied to a line 58. The compressed air passes through filters 60 to a pressure regulator 62 which can be set to supply air to the control system at some selected pressure, for example in a range of 30 to 50 pounds per square inch. From the pressure regulator the air passes to the inlet 64 of a three-way two position valve 66. The three-way valve 66 is actuated by a solenoid 68 and is spring returned. The solenoid 68 is energized upon initiating actuation of an electric timer 70. The electric timer is activated in response to a signal through a line 71 from a conventional electrical control arrangement indicated at 72 used to control such machines. Actuation of the solenoid 68 moves valve 66 from its closed to its opened position and communicates air through a pressure switch 73 and through an air line 74 connected to the air passage 42 in the spindle 12.

In normal operation with a tool bit 20 in good working condition, the machining cycle begins with an electrical signal that starts rapid axial movement of the spindle 12 in its rapid approach phase designated by the dimension 24. At the completion of the rapid approach phase 24 an electrical signal initiates operation of the electric timer for some predetermined period of time, such as 10 seconds, for example. When the electrical timer 70 becomes activated, the solenoid 68 also is actuated to move the three-way valve 66 to its open position so that air is delivered to the remaining portions of the air system such as the pressure switch 73, line 74, passage 42 and connecting passages to deliver air through vent passage 54 to the atmosphere.

As the bit 20 starts to feed into the workpiece 14 the tip of the tool 20 forces the inner element 30 to slide axially relative to the outer element 28 to compress the spring washer 40. As a result, annular passages 48 and 50 move between 0.001 and 0.010 inches causing the annular passages to move out of alignment with each other. This isolates the passages from each other and caused a back pressure to be developed in the passage 42 which registers at the pressure switch 73. By the way of example, the pressure switch 73 can be set for some reasonable operating pressures such as thirty psi. This pressure is achieved promptly upon engagement of the tool 20 with the workpiece 14 and causes an electrical signal to be delivered through the line 78 to the usual machine control panel 72 which causes the control system and the machine to complete the remaining feed stroke of the machining cycle and return the spindle 12 to its original position. The electrical timer 70 serves to maintain the three-way air valve 66 open for a period sufficient to insure an electrical signal from the pressure switch 73 in response to the back pressure generated when the tool 20 subjects the inner element 30 to enough load to close the air vent passage 54. The period of time during which air is supplied need be only a matter of two or three seconds and is represented as being supplied during the period of time that the tool 20 moves through the dimension indicated at 80 in FIG. 1 which is immediately after the rapid approach phase 24.

If tool 20 is broken there will be no force applied to the inner element 30 to move it axially relative to the outer element. As a consequence during the two or three seconds that air is being supplied during movement through dimension 80 the air will continue to be vented from the passage 54 until the electric timer has completed its cycle and discontinues operation. At that time the three-way valve 66 will be conveyed through the line 78 to the control panel to discontinue operation. The control panel can be so arranged that the spindle 12 will return to its original position and shut off the machine from further operation. After the broken tool is replaced normal operation may be resumed.

The embodiment of the invention illustrated in FIG. 1 is particularly adapted for machines in which the spindle 12 is already supplied with air passages such as passage 42. When it is desired to employ a pneumatic sensing device with machines in which the heads 10 do not have an air supply, the spindle 12 is fitted with a special spindle extension 86 as seen in FIG. 3. The extension 86 is fitted with a rotary coupling 88 receiving air through a line 90 from the air control lines 74 seen in FIG. 2. The coupling 88 remains stationary during rotation of the spindle extension 86 together with the spindle 12.

The spindle extension 86 is provided with a bore 92 receiving an adapter 93 including an outer member 94 and an inner member 96 which telescope together to form a cavity 98 for containing a spring washer 100 in the same manner as spring washer 40 seen in FIG. 1a. The inner element 96 detachably receives a tapered tool holder 102 which holds a tool 20.

During operation, air is delivered from the line 90 through the rotary coupling 88 through connecting passageways to an annular passage 108 in the outer element 94. As shown in FIG. 3, the annular passage 108 is out of communication with an annular passage 110 which communicates with a vent passage 111. When the annular passages 108 and 110 are out of alignment as shown in FIG. 3, a back pressure is developed in the line 90 which is made available at the pressure switch 73 of the control system shown in FIG. 2.

In the embodiment shown in FIG. 3, the tool detecting system can operate differently than the embodiment seen in FIG. 1. In this instance initiation of the rapid approach phase of operation also activates the electrical timer 70 for a predetermined amount of time, for example, two to three seconds. At the same time the electrical timer 70 energizes the three-way solenoid operated, spring returned air valve 66 to introduce air to the remaining parts of the system such as the pressure switch 73, the line 74, line 90, rotary coupling 88 and its connecting passageways to the annular passage 108. Since the annular passage 108 is isolated from passage 110 a back pressure of approximately thirty psi will be maintained at the pressure switch 73 during the time that the tools are moving in their rapid approach cycle. If the tool 20 is intact, it will move through its rapid approach cycle and air pressure will be maintained in the system and at the pressure regulator 73. As the tool 20 comes to the feed stroke, that is, that portion of the cycle in which the tool engages the workpiece 14, the electrical timer 70 will expire and stop operating. As a result the air valve 66 is moved to a closed position. The control 72 will not receive an electrical signal, as it would if a tool were broken, and this allows the spindle unit carrying the tool 20 to continue its feed stroke and return to its original position after completion of the desired machining cycle.

In the event that a broken tool 112 as seen in FIG. 3 is in position in workpiece 14 from a previous operation, movement of the tool 20 in its rapid approach phase will cause it to engage the broken tool 112. The resultant resistance subjects the inner element 96 to a load which shifts it axially about 0.001 to 0.010 inches bringing annular passages 108 and 110 into alignment with each other. This allows the air system to vent to atmosphere causing pressure switch 73 to drop to a minimum low pressure. This sends an electrical signal to the control 72 by way of the line 78 which can be used to energize the controls to return the spindle 12 and tool 20 to its original position and stop the machine. In this instance the electrical timer 70 has allowed the air valve 66 to stay open for a sufficient period to insure an electrical signal from the pressure switch due to engagement of tool 20 with a broken tool 112.

From this it can be seen that two forms of operation are possible, one of which could be employed at one station of a multiple station machine and the other form at another station. In the first described operation control is monitored during the feed phase of the full machining cycle and the control panel of the machine gets a signal to continue operation if the tool is indicated as being in proper condition. However, if the tool is broken, the timer will expire without transmitting a signal to the control panel which can be used to operate the master control to stop the machine. In the second form of operation in which the timer is activated during the rapid approach phase, the lack of a signal to the timer permits it to complete its active period and the master control is conditioned to insure continued operation and completion of the machining cycle. On the other hand, if a broken tool is engaged before the feed cycle is reached, a signal will be created during the active period of the timer which results in the master control terminating further operation of the machine.

Figure 6:
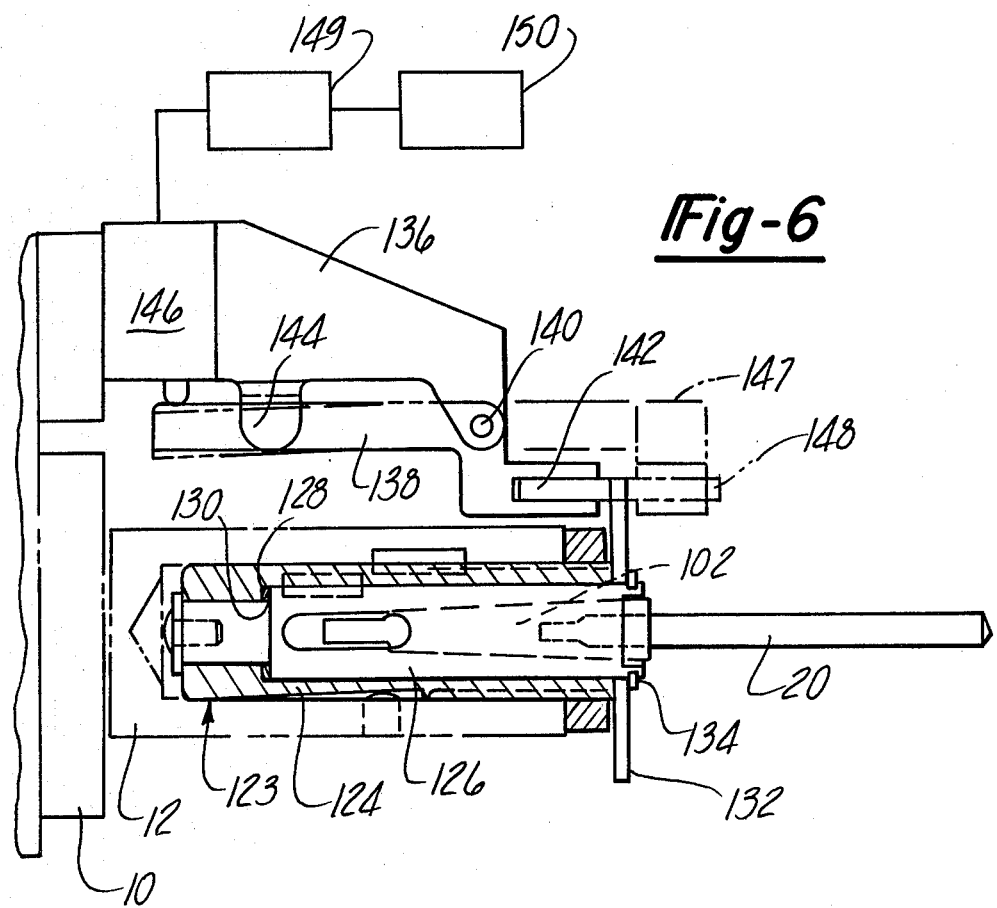

Referring now to FIG. 6 another embodiment of the invention is shown wherein the broken tool detector responds to electrical signals as opposed to air pressure signals. As seen in FIG. 6 the machine head 10 is provided with a spindle 12 receiving an adaptor 123 made up of an outer element 124 and an inner element 126 forming a cavity 128 holding a spring washer 130 in the same manner as spring washer 40 in FIG. 1a. The inner element receives a tapered tool holder 102 for holding a drill 20 as in the embodiment seen in FIG. 3. A collar member 132 having a diameter greater than the spindle 12 is secured to the exposed end of the inner element 126 by means of a snap ring 134.

A bracket 136 is mounted in a stationary position relative to the drill head 10 and typically supports a trip arm 138 for movement about a pin 140. One end of the trip arm 138 is provided with a roller stop element 142 for engaging the rotating collar 132. The other end of the trip arm 138 is biased away from the bracket 136 by means of a spring 144. The bracket 136 also supports a microswitch 146 and when the trip arm 138 is pivoted about the pin 140, the switch 146 is actuated. If desired, a trip arm 147 with a stop element 148 as indicated in broken line in FIG. 6 can be used to replace the arm 138 and stop element 142. In this instance the stop element 148 engages the opposite side of the collar 132 and the spring arrangement 144 must be a tension spring to pull the trip arm toward the microswitch 146. With either the trip arm 138 or the trip arm 147, pivotal movement to actuate the microswitch occurs upon movement of the collar 132 to the left as viewed in FIG. 6 in response to movement of the inner element 126 relative to the outer element 124 to compress the spring washer 130 as would occur upon engagement of the tool 20 with an obstacle such as a workpiece in the feed range of operation or a broken tool remaining in the workpiece during the fast approach phase of operation.

With the arrangement seen in FIG. 6 a timer 149 is activated to operate for approximately two or three seconds after completion of the fast approach phase as indicated by the dimension 80 in FIG. 1. During that time collar 132 is spaced slightly from the end of outer element 124. Subsequently, if the tool 20 is in proper order, a force will be exerted on the inner element 126 compressing the spring washer 130 and pivoting the trip arm 138 or 147 to actuate the microswitch 146 connected to the timer. The signal generated and made available to the timer 149 causes it to become inactive and the control 150 is therefore conditioned to complete the cycle of machining. On the other hand, if the tool 20 is broken, there will be no relative movement between the outer and inner element 124 and 126 during the tool feed phase and the failure of the timer 149 to receive a signal will cause the timer to operate for its predetermined operating period which conditions the control 150 to return the spindle 12 to its original position.

In operations of the type where it is desired to check for broken drills in the workpiece, as illustrated in the embodiment of FIG. 3, the timer 149 for the embodiment in FIG. 6 is arranged to be activated during the rapid tool approach phase. Unless the microswitch 146 is tripped by engagement of the tool 20 with a broken tool to interrupt the timer 149, the timer will complete its period of operation and the control 150 will operate to complete the machining cycle.

Another embodiment of the invention is illustrated in FIG. 5 in which the spindle 12 is provided with a carriage 152 held on the exterior of the spindle 12 by means of a setscrew 154 disposed in an opening 155 sufficiently big to permit the carriage 152 to slide on the exterior of the spindle 12. The carriage has an end wall 156 which forms a cavity 158 with the end of the spindle 12 which receives a spring washer 160. The other end of the carriage 152 is provided with a flange 162 adapted to engage the stop elements 142 or 148 on the end of the trip arm 138 or 147 described more fully in connection with the embodiment in FIG. 6. Until the tool 20 is subjected to an axial load the carriage 152 is spaced from the end of spindle 12 a slight amount.

Still another embodiment of the invention is seen in FIG. 4 wherein the spindle 12 is provided with a conventional standard adapter 164 and a special nut 166 forming a cavity 168 with the end of the spindle 12. The cavity 168 receives a spring washer 170. The nut 166 has a diameter greater than the spindle 12 so that a face surface adjacent its outer periphery is adapted to engage the stop elements 142 or 148 on the trip arms 138 or 147 of the type shown more completely in FIG. 6. Although nut 166 is shown in engagement with the end of spindle 12 there will be a slight spacing due to the action of spring until tool 20 is subjected to a load. Also, the set screw 35 is maintained to prevent obstruction to the relative axial movement of spindle 12 and adapter 164.

Both of the embodiments shown in FIGS. 4 and 5 operate in the manner similar to the embodiment in FIG. 6 during either the feed phase or the rapid approach phase of a machine cycle to generate a signal communicated to the timer 149 and control 150 as shown in FIG. 6.

It will now be seen that a detecting apparatus for machine tools has been provided in which a conventional machine tool spindle receives a special adapter arranged so that a very small relative movement between the tool and spindle when the tool is subjected to a load is used to generate a signal. A timer is activated to operate during certain critical periods of the full cycle of machine operation and the presence or absence of the generated signal during the critical periods of timer operation is used to terminate or continue the fully cycle of operation.

The embodiments of the invention in which an exclusive property or privilege is claimed are defined as follows:

1. A detecting apparatus for a machine tool comprising; a head member, a spindle assembly supported by said head member, means for rotating said spindle assembly and moving it axially from an initial position through a full cycle including an approach phase in which said spindle assembly and a workpiece are moved relative to each other and a feed phase during which work is done on said workpiece, a tool supported by said spindle for rotation therewith and limited axial movement relative thereto, means biasing said tool and spindle to an axially extended position and resisting relative axial movement with a predetermined force when said tool engages an obstacle, means associated with said spindle and being responsive to relative axial movement of said spindle and said tool to generate a signal, a timer activated for a predetermined period of time in a selected one of said phases, said timer being responsive to the presence of said generated signal in said feed phase to continue said cycle and being responsive to said generated signal in said approach phase to discontinue said cycle.

2. The combination of claim 1 wherein said means biasing said tool and spindle is a spring washer.

3. The combination of claim 1 and further comprising an adaptor supported by said spindle, said adaptor including relatively slidably elements forming a cavity holding said biasing means, one of said elements being axially fixed relative to said spindle and the other of said elements supporting said tool.

4. The combination of claim 1 wherein said spindle assembly includes a pair of elements movable axially relative to each other, said elements each being provided with a passage, one passage in one element being in communication with a source of air pressure, the other passage in the other of said elements being in communication with the atmosphere, said elements being movable relative to each other to isolate said passages from each other and create a signal pressure.

5. The combination of claim 4 and further comprising an air valve controlling the delivery of air to said one element, said control valve being movable from a closed to an open position during the time that said timer is actuated, and a pressure switch between said air valve and said one element and being operative in response to an increase in air pressure when said elements are out of communication with each other to develop a signal terminating operation of said timer.

6. The combination of claim 4 wherein said passages are moved out of communication with each other upon engagement of said tool with said workpiece in said feed phase.

7. The combination of claim 4 wherein said air passages are moved into communication with each other upon engagement of said tool with an obstacle imposing a load on said tool which said tool is moving in said approach phase.

8. The combination of claim 1 and further comprising an adaptor member supported by said spindle, a control member mounted on said adaptor for axial movement therewith relative to said spindle, said biasing means being disposed between said control member and said spindle for resiliently resisting relative axial movement of said adaptor and spindle.

9. The combination of claim 8 and further comprising an arm movable to actuate a switch in response to movement of said control member.

10. The combination of claim 8 wherein said adaptor includes relatively slidable elements one of said elements being axially fixed relative to said spindle, said control member being mounted on the other of said elements.

11. The combination of claim 10 wherein said biasing means is disposed between axially spaced portions of said elements.

12. The combination of claim 8 wherein said control member is generally tubular to receive said spindle, said control member having an actuating portion intermediate the ends of said spindle.

13. The combination of claim 12 wherein said biasing means is disposed between one end of said spindle and said control member.

14. The combination of claim 8 wherein said control member is threaded on said adaptor.

* * * * *